United States Patent Office 2,884,844
Patented May 5, 1959

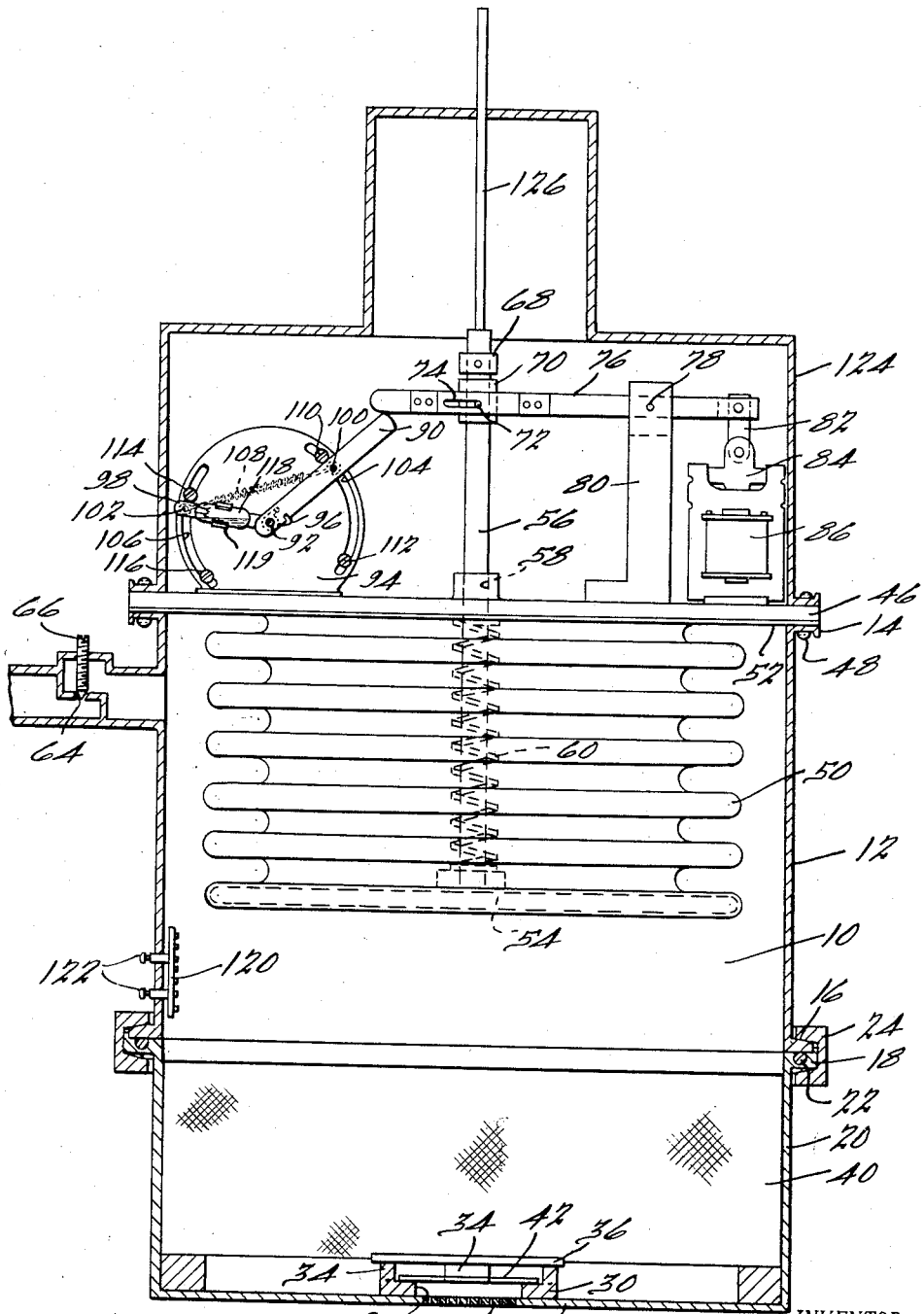

2,884,844

PRESSURE CONTROLLER

Jack D. Sellers, Detroit, Mich.

Application July 9, 1956, Serial No. 596,615

15 Claims. (Cl. 98—1.5)

This invention relates to pressure controlling apparatus and more particularly to apparatus for maintaining an effectively positive gas pressure in a closed system.

The principles of the invention are representatively embodied in an arrangement for establishing and maintaining a low-magnitude positive air pressure in systems which are subjected to conditions tending to produce internal air pressure variations. As an example, for continuous, satisfactory operation, the air within wave guide systems and certain high-frequency communication cable systems should be maintained at a relatively constant pressure and at a controlled, relatively low moisture content. Sealing low humidity air in such systems has not proved fully satisfactory. In commercial practice at least portions of communication channels of the noted nature are subjected to relatively gross changes in environmental temperature. Consequently, if the internal system pressure is so selected that it will remain positive relative to the experienced atmospheric pressure at the lowest temperature to which the system will be exposed, the pressure under high ambient temperatures will tend to rise to a value in excess of that for which the system was designed, tending to force air from the system through any minute cracks, fissures or faults existing in the channel. Conversely, if the initial system pressure is so selected that it will not exceed a preselected maximum value at the highest temperature to which the system will be exposed, or, in the former case, if some of the system air has been expelled under high temperature conditions, then the system pressure will tend to become less than the experienced atmospheric pressure at low ambient temperatures, tending to draw air into the system the moisture content of which is uncontrolled.

In order to maintain an effectively constant positive pressure and controlled humidity of the air in a closed system, the disclosed apparatus partakes of the nature of a compressor, of a regulator and of a desiccator. In general, that apparatus includes a chamber, a bellows or equivalent means for changing the effective volume of that chamber, an output port interconnecting the chamber and the associated system and an input port, including a check valve, interconnecting the chamber and the surrounding atmosphere or other source of gas. The output port includes metering or throttling means permitting the bidirectional flow of air therethrough, so that under stable conditions the system pressure and the chamber pressure are in equality. Since means including the bellows act to maintain an effectively constant chamber pressure, the system pressure likewise remains effectively constant. The output port metering means is provided to permit the establishment of a transient pressure differential thereacross during the intake stroke of the bellows so that the volume of air moved through the input port and into the chamber during that stroke will exceed, to a substantial degree, the volume of air moved into the chamber through the output port. Since in the disclosed and preferred arrangement all fresh air entering the system is passed through a desiccating cartridge, the restriction of the flow of air by the output port, including its metering means, is greater than that offered by the desiccating cartridge and the input port including its valving means.

The input port valving means is unidirectional so that if the system pressure tends to rise the chamber pressure will tend to rise accordingly. Except during the noted intake stroke, the bellows acts as a passive member, contracting upon any increase in chamber pressure in excess of a value determined in the design of the bellows assembly, and expanding upon any decrease in pressure from that value. Consequently, the system-chamber combination can effectively breathe, the bellows continuously tending to assume a position which will maintain the chamber pressure, and hence the system pressure, constant. This breathing action will tend repetitively to expose the system air to the action of the desiccator.

Automatically operating means are provided for producing an intake stroke of the bellows when that bellows attains a preselected degree of expansion, but the extent of that stroke is limited so that the bellows is capable of further contraction in the event the system pressure rises, from external causes, after the intake stroke is completed. Improved snap-acting switching means are associated with the bellows and with the bellows actuating equipment to insure optimum operation of the apparatus.

A more complete understanding of the invention may be obtained from the following detailed description of an illustrative embodiment of the invention, when read with reference to the accompanying drawing in which the figure is a vertical sectional view of an apparatus involving the principles of the present invention and including one form of snap-action control means.

The pressure controlling apparatus disclosed in the drawing includes an air chamber 10 laterally defined by a generally circular cylindrical tubular body 12 provided with upper and lower annular flanges 14 and 16, respectively. The lower surface of the lower flange 16 abuts the upper surface of a flange 18 formed at the upper edge of a canister 20. A sealing ring 22 is desirably seated in the face of one of the mating flanges, representatively flange 18, to insure an airtight canister-to-body seal.

Suitable means are provided for detachably securing the canister 20 to the body 12. In the disclosed arrangement, a clamping ring 24 is disposed circumferentially of the assembly, the opposed inner tapered faces thereof engaging the correspondingly tapered face surfaces of flanges 16 and 18. Any appropriate means, not shown, may be employed to reduce the effective length of ring 24 to produce a clamping action, including a bolt engaging spaced-apart, radially extending end projections on the ring 24. Obviously, the clamping ring 24 should either be sufficiently resilient so that it can be spread away from the flanges to permit removal of the canister 20 or be hinged at one or more points in its periphery.

The base 26 of the canister 20 is centrally perforated as at 28 to permit the inflow of air ambient to the apparatus. An annular member 30 is secured to the base 26 with its central opening 32 disposed in alignment with the perforated portion 28 of the base 26. A plurality of peripherally spaced upstanding projections 34 are formed integrally with the annular member 30 and support a circular blocking plate 36. Blocking plate 36, aided if necessary by an annular support member 38, supports a desiccating unit 40. In its preferred form, unit 40 comprises a relatively flexible mesh cartridge carrying a suitable desiccant in bead or pellet form. The cartridge should slide freely into and from the canister 20 but the engagement between the cartridge and the wall of the canister 20 and the annular support 38 should be sufficiently intimate so that the inflowing air will be forced to pass through the body of the desiccating unit 40.

The upper face of the annular member 30 serves as the valve seat portion and the projections 34 serve as a cage, cooperating with disk 42 to function as a unidirectional valving means. Disk 42 and the valve seat should form a relatively tight air seal when those parts are in engagement, a gasket and bracing spring being provided if necessary. Elements 30 and 42 serve as a check valve, a reduction in the air pressure at the upper surface of the disk 42 (on the intake or power stroke of the equipment as will be described) resulting in an upward displacement of the disk 42 by the pressure of the ambient air, the incoming air flowing through the perforated portion 28, between the disk 42 and the seat portion of the annular member 30, through the spaces between the projections 34 and through the desiccating unit 40 to the chamber 10, that flow of air overcoming the weight of disk 42.

A circular plate 46 surmounts the body 12 and serves as the upper closure for chamber 10. Flange 14 and plate 46 are secured together by any suitable means such as machine screws 48. A bellows 50 is disposed within chamber 10, the annularly projecting upper lip portion 52 of which is sealed between flange 14 and plate 46. The lower fold of bellows 50 encloses a plate 54 to which is secured a shaft 56 passing through an aperture 58 in the plate 46. Compression spring 60 disposed around shaft 56 and internally of bellows 50 exerts a continuing force tending to cause the bellows to expand. It is desirable that spring 60 have an approximately linear action over the expected range of movement of the bellows 50 or that the bellows assembly be otherwise constructed to produce a roughly linear relationship between its effective volume and the pressure in chamber 10. Gravity bias may alternatively be employed.

Chamber 10 is connected to the associated system through a metering means including a metering orifice 64 the effective size of which is preselectable by means of needle valve 66. It will be perceived that the action is truly bidirectional, with air being capable of flowing, with limitations upon its rate of flow, both from the associated system to the chamber 10 and from the chamber 10 to the associated system. With the bellows 50 in some intermediate position, such as that illustrated, an increase in system pressure due to, for example, a rise in temperature of the atmosphere ambient to the system will cause air to flow from that associated system through the metering orifice 64 and into the chamber 10, tending to increase the pressure in that chamber. However, any such increase in pressure will cause bellows 50 to contract against the action of spring 60, the resultant increase in effective volume of chamber 10 producing a compensating reduction in the chamber pressure until equilibrium is achieved and maintained at the selected system and chamber pressure. Conversely, upon a decrease in pressure in the system due, for example, to a reduction in the temperature of the system, spring 60 will force bellows 50 to expand, forcing air from chamber 10 through orifice 64 and to the system to maintain the pressure in that system at the selected value. As a result, the system and chamber pressure will tend to remain effectively constant, the bellows expanding or contracting to adjust the effective volume of chamber 10 to maintain that preselected system pressure. Since the rate of change of the external conditions is normally not great in practice, the effective size of orifice 64 may be small. Obviously the size of orifice 64 need not be adjustable in any given installation.

If the system pressure drops excessively due to an unexpectedly gross reduction in atmospheric temperature or due to leakage from the system, bellows 50 will expand and rod 56 will descend to a point approaching a limit position. Under those circumstances, means are actuated for rapidly contracting bellows 50 to draw additional air into the system. Thus, an adjustable collar 68 is secured upon shaft 56 near the upper end thereof while a collar 70 is slidably disposed upon that shaft below collar 68. A pin 72 extending laterally from collar 70 engages a slot 74 in an arm 76 which is pivotally mounted at 78 upon a bracket 80 secured to plate 46. The other end of arm 76 is secured by a pivotal link 82 to the plunger 84 of a solenoid 86, also mounted upon the plate 46. In the disclosed arrangement, it is assumed that the weight of the plunger 84 is such that the arm 76 will be gravitationally biased to its shown position. Alternatively, spring biasing means may be mounted to continuously force arm 76 and collar 70 towards its shown limit position, that limit position being defined, in the shown arrangement, by bottoming of the plunger 84.

It will be perceived that with this arrangement, the shaft 56 and collar 68 may move upwardly relative to collar 70 as the bellows 50 contracts from its shown position but that as bellows 50 expands or moves downwardly from its shown position, collar 68 will engage collar 70 carrying collar 70 and arm 76 downwardly therewith. Downward movement of operating arm 76 will rotate switch arm 90 in a clockwise direction about a pivotal axis defined by pin 92 secured to a support bracket 94 mounted upon plate 46. One end of a light coil spring 96 is anchored to pin 92 and the other end of that spring engages the lower edge of arm 90 to exert a continuing force tending to rotate arm 90 in a counterclockwise direction. A toggle link 98 is also pivotally mounted upon pin 92 and extends generally oppositely to the arm 90. Studs 100 and 102 are secured to arm 90 and link 98, respectively, and pass through arcuate slots 104 and 106, respectively, in the bracket 94. A tension spring 108 on the other side of bracket 94 from arm 90 and link 98, extends between studs 100 and 102, exerting a force tending to reduce the angle between that arm and link. Adjustable stops 110 and 112 establish limit positions for the rotational movement of arm 90 and adjustable stops 114 and 116 establish limit positions for the rotational movement of link 98.

A mercury switch 118 is retained by clip 119 upon link 98, the angular position of that switch preferably being adjustable relative to the longitudinal axis of toggle link 98.

As arm 76 rotates arm 90 in a clockwise direction, the axis of spring 108 is correspondingly shifted. When that axis has moved below the longitudinal axis of pin 92, spring 108 will cause link 98 rapidly to swing to its lower limit position, producing a snap-action actuation of switch 118. The contacts of switch 118 are intended to be connected in a series circuit including a source of energy and the winding of solenoid 86. Since the counterclockwise movement of arm 76 has drawn plunger 84 of solenoid 86 upwardly, upon the abrupt closure of the contacts of switch 118 and the consequent energization of solenoid 86, plunger 84 will be rapidly moved downwardly to its operated position and operative arm 76 will be rotated in a clockwise direction to its shown position. The resultant upward motion of collar 70 will be communicated to collar 68 since they are in engagement so that shaft 56 will be restored to its shown position. The resulting rapid contraction of bellows 50 will cause additional air to be drawn through the input check valving means into the chamber 10. Since the restriction to air flow offered by the output metering means is great relative to that offered by the input check valve and desiccator, there will be no substantial reduction in system air pressure as a result of and during this power or intake stroke.

When arm 76 moves upwardly during this power or intake stroke, arm 90 is rotated in a counterclockwise direction by spring 96 towards its shown position. During the course of that movement, the axis of spring 108 will recross the axis of pin 92, snapping link 98 to its shown position and terminating energization of solenoid 86. It will be appreciated that spring 96 must be stronger in its effect than is spring 108 to permit arm 90 to be moved in a counterclockwise direction, but both springs are preferably sufficiently light so that they do not materially directly affect the action of bellows 50.

If desired, switch 118 may be mounted on arm 90 with toggle link being employed to provide a snap action movement of arm 90 during the critical, contact closing portion of the rotational motion of that arm, or link 98 may be omitted if desired. Alternatively, with care in design, switch 118 may be mounted on arm 76, the other elements 90 to 116 being omitted.

If desired, auxiliary control equipment may also be incorporated in the apparatus. For example, a humidity sensing device 120 may be sealed within chamber 10, with its output electrical terminals 122 protruding through the wall of the body 12. Circuitry can be associated with senser 120 to provide an alarm in the event that the humidity of the air in chamber 10 rises above a selected degree, connoting either a system failure or that the desiccant 40 requires replacement.

If desired, a pair of electrical contacts may be mounted within cap 124 in a position to be actuated once each power stroke of the equipment. For example, a contact spring assembly may be mounted on but insulated from plate 46 in a position to be engaged by arm 76 or 90 as they reach or approach the lower limits of their travels. These contacts may control a counter mechanism or a counting-timing apparatus indicating the frequency of the cycling of the apparatus.

To protect the operating equipment, a stepped tubular cap 124 is screwed or otherwise removably secured to plate 46. A rod 126 secured to the upper end of shaft 56 protrudes through the cap 124. Since the extent of contraction or expansion of bellows 50 is a function of system pressure, rod 26 may be calibrated to provide a continuous indication of that pressure.

While it will be apparent that the embodiment of the invention herein disclosed is well calculated to fulfill the object of the invention, it will be appreciated that the invention is susceptible to modification, variation and change without departing from the proper scope or fair meaning of the subjoined claims.

What is claimed is:

1. An apparatus for controlling the pressure of a gas in a closed system subject to variations in environmental conditions tending to produce variations in pressure of the gas, comprising a body defining a chamber, unidirectional valving means connecting said chamber to a source of gas, metering means connecting said chamber to the closed system, said metering means restricting the flow of gas therethrough to the same degree in both directions, pressure responsive means for adjusting the effective volume of said chamber to maintain an effectively constant gas pressure throughout said chamber and system, and means including said pressure responsive means and effective only when the pressure in said chamber drops below a preselected value for introducing additional gas into said chamber through said valving means.

2. An apparatus for controlling the pressure of a gas in a closed system subject to variations in environmental conditions tending to produce variations in pressure of the gas, comprising a body defining a chamber, means including unidirectional valving means connecting said chamber to a source of gas, means connecting said chamber to the closed system, pressure responsive means responsive to an incipient reduction in the pressure in said chamber for reducing the effective volume of said chamber and closed system in direct proportion to the reduction in pressure and responsive to an incipient increase in the pressure in said chamber for increasing the effective volume of said chamber and closed system in direct proportion to the increase in pressure for adjusting the effective volume of said chamber to maintain an effectively constant gas pressure throughout said chamber and system, and means including said pressure responsive means operative when the effective volume of said chamber is reduced to a preselected value for introducing additional gas into said chamber through said valving means.

3. An apparatus for controlling the pressure and moisture content of a gas in a closed system subject to variations in environmental conditions tending to produce variations in pressure of the gas, comprising a body defining a chamber, metering means connecting said chamber to the closed system, said metering means restricting the flow of gas therethrough to the same degree in both directions, pressure responsive means for adjusting the effective volume of said chamber to maintain an effectively constant gas pressure throughout said chamber and system, and desiccating means disposed in said chamber, repeated changes in environmental temperature producing repeated movements of the gas between the system and the chamber so as repeatedly to expose varying quantities of the gas to the action of the desiccating means.

4. An apparatus for controlling the pressure and moisture content of a gas in a closed system subject to variations in environmental conditions tending to produce variations in pressure of the gas, comprising a body defining a chamber, unidirectional valving means connecting said chamber to a source of gas, metering means connecting said chamber to the closed system, said metering means restricting the flow of gas therethrough to the same degree in both directions, pressure responsive means for adjusting the effective volume of said chamber to maintain an effectively constant gas pressure throughout said chamber and system, desiccating means disposed in said chamber, and means including said pressure responsive means and effective only when the pressure in said chamber drops below a preselected value for introducing additional gas into said chamber through said valving means and through said desiccating means.

5. An apparatus for controlling the pressure of a gas in a closed system subject to variations in environmental conditions tending to produce variations in pressure of the gas, comprising a body defining a chamber, unidirectional valving means connecting said chamber to a source of gas, metering means connecting said chamber to the closed system, pressure responsive means for adjusting the effective volume of said chamber to maintain an effectively constant gas pressure throughout said chamber and system, and means including said pressure responsive means for introducing additional gas into said chamber through said valving means, said metering means restricting the flow of gas therethrough to the same degree in both directions and to a greater degree than the inflow of gas to said chamber is restricted by said valving means.

6. An apparatus for controlling the pressure of a gas in a closed system subject to variations in environmental conditions tending to produce variations in pressure of the gas, comprising a body defining a chamber, pressure responsive means for adjusting the effective volume of said chamber to maintain an effectively constant gas pressure throughout said chamber and system comprising a bellows within and occupying a variable portion of the volume of said chamber and means for exerting a preselected force tending to expand said bellows, unidirectional valving means connecting said chamber to a source of gas, metering means connecting said chamber to the closed system, said metering means restricting the flow of gas therethrough to the same degree in both directions and to a greater degree than said valving means restricts inflow of gas to said chamber, and means including said bellows for introducing additional gas into said chamber through said valving means.

7. An apparatus for controlling the pressure of a gas in a closed system subject to variations in environmental conditions tending to produce variations in pressure of the gas, comprising a body defining a chamber, pressure responsive means for adjusting the effective volume of said chamber to maintain an effectively constant gas pressure throughout said chamber and system comprising a bellows within and occupying a variable portion of the volume of said chamber and means for exerting a preselected force tending to expand said bellows, means including unidirectional valving means connecting said chamber to a source of gas, means connecting said chamber to the closed system, said bellows expanding in response to an incipient reduction in the pressure in said chamber and closed system to decrease the effective volume of said chamber and closed system in direct proportion of the reduction in pressure, said bellows contracting in response to an incipient increase in the pressure in said chamber and closed system to increase the effective volume of said chamber and closed system in direct proportion to the increase in pressure, and means effective when said bellows has expanded to a preselected extent for rapidly contracting said bellows to draw additional gas into said chamber through said valving means.

8. An apparatus for controlling the pressure of a gas in a closed system subject to variations in environmental conditions tending to produce variations in pressure of the gas, comprising a body defining a chamber, pressure responsive means for adjusting the effective volume of said chamber to maintain an effectively constant gas pressure throughout said chamber and system comprising a bellows within and occupying a variable portion of the volume of said chamber, a shaft secured to said bellows and movable along its longitudinal axis as said bellows expands and contracts, means for exerting a preselected force tending to expand said bellows, unidirectional valving means connecting said chamber to a source of gas, metering means connecting said chamber to the closed system, said metering means restricting the flow of gas therethrough to the same degree in both directions and to a greater degree than said valving means restricts inflow of gas to said chamber, and means effective when said shaft has moved in one direction to a preselected position for rapidly moving said shaft in the opposite direction to a different preselected position.

9. An apparatus for controlling the pressure of a gas in a closed system subject to variations in environmental conditions tending to produce variations in pressure of the gas, comprising a body defining a chamber, a bellows within and occupying a variable portion of the volume of said chamber, means for exerting a preselected force tending to expand said bellows, unidirectional valving means connecting said chamber to a source of gas, metering means connecting said chamber to the closed system, said metering means restricting the flow of gas therethrough to the same degree in both directions and to a greater degree than said valving means restricts inflow of gas to said chamber, and means effective when said bellows has expanded to a preselected position for rapidly contracting said bellows to a position between the fully expanded and the fully contracted positions of said bellows so that additional air is drawn into said chamber through said valving means but so that said bellows is subject to further contraction if the system pressure tends to increase.

10. An apparatus for controlling the pressure of a gas in a closed system subject to variations in environmental conditions tending to produce variations in pressure of the gas, comprising a body defining a chamber, a bellows within and occupying a variable portion of the volume of said chamber, means for exerting a preselected force tending to expand said bellows, unidirectional valving means connecting said chamber to a source of gas, metering means connecting said chamber to the closed system, said metering means restricting the flow of gas therethrough to the same degree in both directions and to a greater degree than said valving means restricts inflow of gas to said chamber, and means effective when said bellows has expanded to a preselected extent for rapidly contracting said bellows to draw additional gas into said chamber through said valving means, said means for contracting said bellows comprising an operating arm operatively associated with and movable by said bellows during expansion thereof, a switch actuable by said arm, and actuating means controlled by said switch for moving said arm in a direction to contract said bellows.

11. An apparatus for controlling the pressure of a gas in a closed system subject to variations in environmental conditions tending to produce variations in pressure of the gas, comprising a body defining a chamber, metering means connecting said chamber to the closed system, valving means connecting said chamber to a source of gas, means movable over a positional range for varying the effective volume of said chamber, actuating means for moving said movable means to a first preselected position, and control means effective when said movable means reaches a second preselected position for operating said actuating means, said control means including a pivotally mounted switch arm, an operating arm movable by said movable means and engageable with said switch arm, and electrical contact means controlled by said switch arm.

12. An apparatus for controlling the pressure of a gas in a closed system subject to variations in environmental conditions tending to produce variations in pressure of the gas, comprising a body defining a chamber, metering means connecting said chamber to the closed system, valving means connecting said chamber to a source of gas, means movable over a positional range for varying the effective volume of said chamber, actuating means for moving said movable means to a first preselected position, and control means effective when said movable means reaches a second preselected position for operating said actuating means, said control means including a pivotally mounted switch arm having two limit positions, an operating arm movable by said movable means and engageable with said switch arm, electrical contact means controlled by said switch arm, and means tending to retain said switch arm in each of said limit positions.

13. An apparatus for controlling the pressure of a gas in a closed system subject to variations in environmental conditions tending to produce variations in pressure of the gas, comprising a body defining a chamber, metering means connecting said chamber to the closed system, valving means connecting said chamber to a source of gas, means movable over a positional range for varying the effective volume of said chamber, actuating means for moving said movable means to a first preselected position, and control means effective when said movable means reaches a second preselected position for operating said actuating means, said control means including a pivotally mounted switch arm having two limit positions, an operating arm movable by said movable means and engageable with said switch arm, electrical contact means controlled by said switch arm, and means tending to retain said switch arm in each of said limit positions comprising a toggle link pivotally mounted relative to said switch arm, means defining limits to the pivotal movement of said line, and a tension spring interconnecting said link and said switch arm.

14. An apparatus for controlling the pressure of a gas in a closed system subject to variations in environmental conditions tending to produce variations in pressure of the gas, comprising a body defining a chamber, metering means connecting said chamber to the closed system, valving means connecting said chamber to a source of gas, means movable over a positional range for varying the effective volume of said chamber, actuating means for moving said movable means to a first preselected position, and control means effective when said movable means reaches a second preselected position for operating said actuating means, said control means including a pivotally mounted switch arm having two limit positions, an operating arm movable by said movable means and engageable with said switch arm, electrical contact means controlled by said switch arm, and means tending to retain said switch arm in each of said limit positions comprising a toggle link pivotally mounted relative to said switch arm, means defining limits to the pivotal movement of said link, and a tension spring interconnecting said link and said switch arm, said electrical contact means comprising a mercury switch actuatable upon tilting and mounted upon said switch arm.

15. An apparatus for controlling the pressure of a gas in a closed system subject to variations in environmental conditions tending to produce variations in pressure of the gas, comprising a body defining a chamber, metering means connecting said chamber to the closed system, valving means connecting said chamber to a source of gas, means movable over a positional range for varying the effective volume of said chamber, actuating means for moving said movable means to a first preselected position, and control means effective when said movable means reaches a second preselected position for operating said actuating means, said control means including a pivotally mounted switch arm having two limit positions, an operating arm movable by said movable means and engageable with said switch arm, electrical contact means controlled by said switch arm, and means tending to retain said switch arm in each of said limited positions comprising a toggle link pivotally mounted relative to said switch arm, means defining limits to the pivotal movement of said link, and a tension spring interconnecting said link and said switch arm, said electrical contact means comprising a mercury switch actuatable upon tilting and mounted upon said link.

References Cited in the file of this patent

UNITED STATES PATENTS

| | | |
|---|---|---|
| 1,780,336 | Canton | Nov. 4, 1930 |
| 2,439,793 | Braddon | Apr. 20, 1948 |
| 2,640,558 | Dauphinee | June 2, 1953 |